Feb. 18, 1958 R. R. McDANIEL 2,824,201
SOLDERING IRON HAVING A SOLDER CARTRIDGE
Filed March 10, 1955
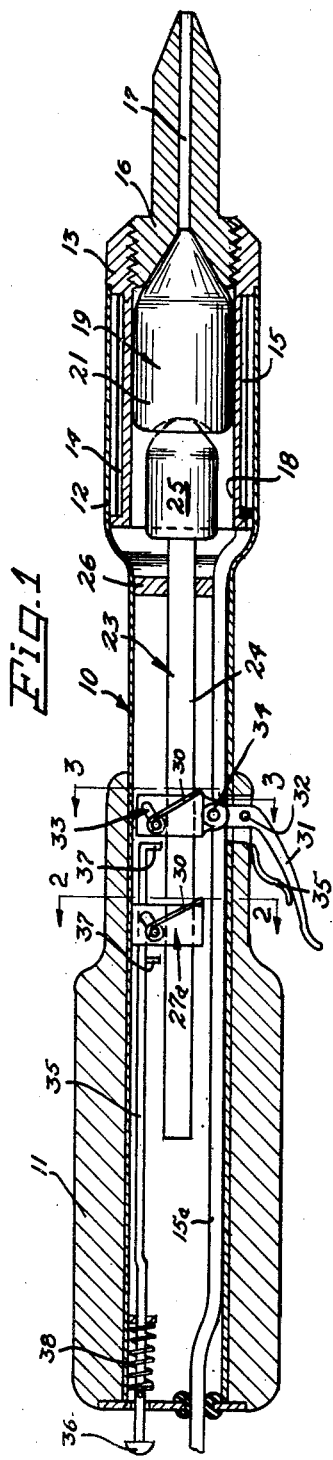
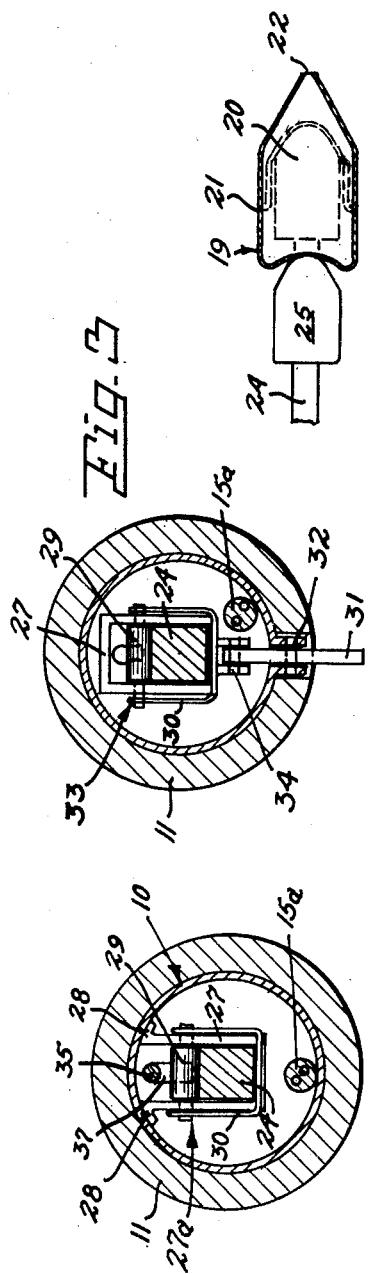
INVENTOR.
Robert R. McDaniel
BY
Fish and Huff

United States Patent Office 2,824,201
Patented Feb. 18, 1958

2,824,201

SOLDERING IRON HAVING A SOLDER CARTRIDGE

Robert R. McDaniel, Spokane, Wash.

Application March 10, 1955, Serial No. 493,402

3 Claims. (Cl. 219—27)

This invention relates to improvements in soldering irons and has particular reference to a soldering iron wherein the solder is fed to the iron from a point within the iron during the soldering operation as opposed to the usual method, wherein a strip of solder is held against the outside of the iron, requiring two hands in order to complete the work.

A further object of the invention lies in the provision of a novel soldering cartridge adapted for use in a soldering iron of the type disclosed.

A still further object of the invention lies in the provision of a heated soldering iron having an apertured tip which vents a receiving cavity adapted to contain molten solder, and having a manually actuable ejecting mechanism for discharging molten solder in quantities as desired.

These and other important objects and advantages of the present invention will be apparent during the course of the following description.

In the accompanying drawing forming a part of this specification and in which like numerals are employed to designate like parts throughout the same.

Figure 1 is a longitudinal cross section of one physical embodiment of my invention;

Figure 2 is an enlarged transverse cross section taken on the plane indicated by lines 2—2 of Figure 1 and in the direction indicated by the arrows;

Figure 3 is an enlarged transverse cross section taken on the planes indicated by lines 3—3 of Figure 1 and in the direction indicated by the arrows; and Figure 4 is a diagrammatic view illustrating the cooperating functions of the ejecting head and the solder cartridge for ejecting molten solder therefrom.

It has been common practice to employ a soldering iron comprising a handle with a copper soldering tip or point attached thereto and in most instances heated by an electric element. When it is desired to solder something, it is customary to hold the heated point against the work to be soldered and at the same time apply solder in strip form to the point of the iron, whereupon the solder is melted or fused and flows upon the work prepared to receive it. This operation requires the use of both hands and in many instances, when the work to be soldered is quite small, it is dfficult to fix the work in a position wherein the soldering operation, may be performed conveniently.

With my improved soldering iron, the operation may be completed by the use of one hand, leaving the other hand free to hold the work or for other purposes as found necessary.

In the accompanying drawing, wherein for the purpose of illustration is shown a preferred embodiment of my invention, the numeral 10 designates a soldering iron body which, as seen in the drawing, is tubular and has at one end a heat insulating handle 11. At the opposed end the body is enlarged or increased in circumference with respect to its reduced central portion to form an enlarged housing 12.

An annular spool-like member 13 is fitting within the housing 12 and has an annular recess 14 which together with the housing 12 define a space in which an electrical element 15 is disposed. An electric service cord 15a extends through the body 10 and connects the element 15 with the electric service in a conventional manner. At its forward end, the member 13 is internally threaded to receive an apertured soldering tip 16.

The soldering tip 16 has an axial aperture 17 which vents the inner annular receiving cavity 18 of the member 13. The tip 16 and the member 13 are threadedly engaged for selective manual removal of the tip, the purpose of which is to facilitate inserting a solder cartridge 19 which consists of a mass or slug of solder 20 shaped somewhat like a bullet slug with a forwardly tapered end which is completely enclosed in a flexible envelope 21 of a material which is fusible at a temperature substantially higher than the fusing temperature of the solder 20.

For instance, the fusing temperature of solder may range conventionally from 155° F. to 700° F. while the fusion temperature of normal solder is 360°. The envelope 21 may be formed, for example, of aluminum foil, and since the fusion temperature of aluminum is 1,400° F., the cartridge may be heated sufficiently to cause the solder to become molten and yet prevent the envelope from being melted. Other materials may be employed as the substance of the envelope, so long as it is fusible at a temperature substantially higher than the fusing temperature of the solder contained therein.

Initially the solder cartridge will be provided with a minute opening at 22 by means of which the molten solder may be admitted into the envelope 21, and this will serve as an egress opening for the molten solder as it is confined in the receiving cavity 18 of the solder iron body 10.

Obviously it is necessary to apply pressure to the heated cartridge 19 containing the molten solder to cause the solder to be discharged therefrom. I therefore provide a solder ejecting mechanism, indicated in its entirety by the numeral 23, which comprises a reciprocal rod 24 carrying at its forward end an ejecting head 25 disposed in the receiving cavity 18 behind the solder cartridge 19. Therefore as the rod 24 is shifted forwardly, its rectilinear movement causes the head 25 to apply pressure to the envelope 21 and thus eject the molten solder through the opening 22 and the aperture 17 of the tip 16, and present the molten solder to the work being soldered.

Since only a limited amount of solder is required for each soldering function, I provide means for manually shifting the rod 24 in successive selected amounts. To accomplish this, I support the forward end of the rod 24 in a bearing 26 while its rearward end is supported by a yoke 27 rigidly fixed as by welding at 28 within the tubular body 10 of the soldering iron. The yoke is provided with a roller or other gripping member 29 which is urged by means of a spring 30 into gripping relation with the rod 24. This provides a unidirectional rod-gripping mechanism 27a rigid with the body 10. The structure as disclosed will permit free movement of the rod 24 forwardly toward the tip 16 of the soldering iron and normally prevent its return or rearward movement therein.

To effect manual control over and impart movement to the rod 24, I provide a manually actuable trigger 31 which is pivoted at 32 on the handle 11 of the soldering iron, and carries a unidirectional rod-gripping mechanism 33 of the same structure described herein for the other unidirectional rod-gripping mechanism, except that the yoke is not secured to the body 10 but is pivotally secured at 34 to the trigger 31. A spring 35 biases the trigger outwardly of the body, and the operator may compress it by manual pressure. Compression of the trigger 31 serves to shift the mechanism 33 forwardly and thus the rod 24, whereupon the spring 35 returns the trigger upon release and permit the mechanism to return for another grip on the rod, thus effectively shifting the rod in manually controlled successive movements.

When substantially all of the solder has been ejected from the envelope 21, and it is desired to replace the cartridge 19 with a new cartridge, the tip 16 may be removed from the member 13 and the old cartridge removed ready for applying a new cartridge.

Since the unidirectional rod-gripping mechanisms prevent rearward movement of the rod 24, I provide a releasing plunger 35 which is carried by the soldering iron body 10 and has a rearward thumb button 36 which when pressed moves the plunger 35 forwardly, wherein the tongues 37 contact the rollers 29 of the gripping mechanisms, releasing them from the bar 24 and permitting its movement by gravity or otherwise rearwardly to its extreme rearward position wherein the ejection head 25 is resting against the bearing 26. The spring 38 maintains the tongues 37 out of engagement with the rollers until the plunger 35 is shifted by manual pressure on the button 36.

Having thus described my invention, I claim:

1. A soldering iron comprising a tubular body having a handle at one end and a receiving cavity at the opposed end; an apertured tip disposed at the cavity end of said body and venting said cavity; a solder cartridge disposed in said cavity; an electric element encircling said cavity and adapted to heat said cartridge and tip sufficiently to fuse said solder; a reciprocal rod within the body; a unidirectional rod-gripping mechanism carried by said body and operably associated with said rod to normally permit rectilinear movement of said rod in one direction only, for ejecting solder from said cavity; and a second unidirectional rod-gripping mechanism carried by said rod and reciprocally actuable to successively impart rectilinear movement to said rod in said one direction.

2. A soldering iron comprising a tubular body having a handle at one end and a receiving cavity at the opposed end; a solder cartridge in said cavity; an apertured soldering tip disposed at the cavity end of said body and venting said cavity; an electric element encircling said cavity and adapted to heat said cartridge and tip sufficiently to fuse said solder; a reciprocal rod in the body having an ejecting head on the end thereof adjacent to said solder cartridge; means supporting said rod for rectilinear movement; a unidirectional rod-gripping mechanism rigid with the body and a second unidirectional rod-gripping mechansm carried by said rod; and a manually operated trigger mechanism pivotally carried by said body and pivoted to said second-named unidirectional rod-gripping mechanism to reciprocate said mechanism and successively impart rectilinear movement to said rod in the direction of said solder cartridge.

3. In combination, a soldering iron having a receiving cavity and an apertured soldering tip venting said cavity; a solder cartridge removably disposed in said cavity and comprising a slug of solder material fusible at a temperature selected from between 155° F. and 700° F., and enclosed within a flexible envelope fusible at a substantially higher temperature than said solder and having an egress opening communicating with the aperture of said tip, and manually operable means for pressing upon said envelope whereby said solder may be selectively ejected through said tip when fused.

References Cited in the file of this patent
UNITED STATES PATENTS

| | | |
|---|---|---|
| 558,126 | Van Horne | Apr. 14, 1896 |
| 878,182 | Blake | Feb. 4, 1908 |
| 1,233,614 | Self | July 17, 1917 |
| 1,928,129 | Hornack | Sept. 26, 1933 |
| 2,094,795 | Johnson | Oct. 5, 1937 |
| 2,125,250 | Temple | July 26, 1938 |